(12) United States Patent
Wu et al.

(10) Patent No.: US 9,813,517 B2
(45) Date of Patent: Nov. 7, 2017

(54) FEEDBACK LAYER FOR NATIVE CONTENT DISPLAY IN VIRTUAL DESKTOP INFRASTRUCTURE

(71) Applicant: VMware, Inc., Palo Alto, CA (US)

(72) Inventors: Junfei Wu, Beijing (CN); Yao Zhang, Beijing (CN); Zhibin He, Beijing (CN); Shengbo Teng, Beijing (CN); Yunquan Peng, Beijing (CN)

(73) Assignee: VMware, Inc., Palo Alto, CA (US)

( * ) Notice: Subject to any disclaimer, the term of this patent is extended or adjusted under 35 U.S.C. 154(b) by 103 days.

(21) Appl. No.: 14/290,487

(22) Filed: May 29, 2014

(65) Prior Publication Data

US 2015/0350360 A1 Dec. 3, 2015

(51) Int. Cl.
| | |
|---|---|
| G06F 15/16 | (2006.01) |
| G06F 17/22 | (2006.01) |
| G06F 17/30 | (2006.01) |
| G06F 3/048 | (2013.01) |
| H04L 29/08 | (2006.01) |
| H04W 4/18 | (2009.01) |
| G06F 9/44 | (2006.01) |
| G06F 3/14 | (2006.01) |

(52) U.S. Cl.
CPC .......... *H04L 67/2823* (2013.01); *G06F 3/048* (2013.01); *G06F 9/4445* (2013.01); *H04L 67/08* (2013.01); *H04L 67/289* (2013.01); *H04W 4/18* (2013.01); *G06F 3/14* (2013.01); *G06F 17/3089* (2013.01); *G06F 17/30899* (2013.01); *G06F 17/30905* (2013.01); *G06F 2203/0383* (2013.01)

(58) Field of Classification Search
CPC .. G06F 17/30905; G06F 3/14; G06F 17/2247; G06F 17/30241
See application file for complete search history.

(56) References Cited

U.S. PATENT DOCUMENTS

| | | | |
|---|---|---|---|
| 2009/0210514 A1* | 8/2009 | Davis ................ | G06F 17/30905 709/219 |
| 2009/0265627 A1 | 10/2009 | Kim et al. | |
| 2009/0313574 A1* | 12/2009 | Shih ..................... | G06F 3/0483 715/781 |
| 2012/0233540 A1* | 9/2012 | Collet ................... | G06Q 30/02 715/234 |
| 2013/0152009 A1* | 6/2013 | Caliendo, Jr. ...... | G06F 17/30905 715/781 |
| 2013/0191902 A1* | 7/2013 | Friedl .................. | H04L 9/3271 726/7 |

(Continued)

*Primary Examiner* — Nicholas Taylor
*Assistant Examiner* — Ho Shiu

(57) ABSTRACT

In one embodiment, a mobile computing device receives content in a desktop compatible format. The content is generated by a remote desktop executing an application. The mobile computing device determines a conversion of at least a first portion of the content to a native display format of the mobile computing device and displays the conversion of the at least the first portion of the content in the native display format on an interface. Also, the mobile computing device displays at least a second portion of the content in the desktop compatible format on the interface where the at least the second portion of the content in the desktop compatible format corresponds to the conversion of the at least the first portion of the content in the native display format of the mobile computing device.

20 Claims, 6 Drawing Sheets

(56) References Cited

U.S. PATENT DOCUMENTS

| | | | |
|---|---|---|---|
| 2013/0326333 A1* | 12/2013 | Hashmi | G06F 17/2247 715/234 |
| 2014/0047413 A1* | 2/2014 | Sheive | H04L 65/403 717/110 |
| 2014/0075377 A1* | 3/2014 | Kang | G06F 3/04842 715/788 |
| 2014/0250357 A1* | 9/2014 | Ryu | H04M 1/0245 715/205 |
| 2014/0344806 A1* | 11/2014 | Suresh | G06F 9/4445 718/1 |
| 2015/0119033 A1* | 4/2015 | Maria | H04W 48/18 455/435.2 |
| 2015/0334162 A1* | 11/2015 | Krishnamurthy | H04L 67/025 715/740 |

* cited by examiner

FEEDBACK LAYER FOR NATIVE CONTENT DISPLAY IN VIRTUAL DESKTOP INFRASTRUCTURE

BACKGROUND

Virtual desktop infrastructure (VDI) refers to a system that uses a remote display protocol that allows a user's client device to connect to a remote desktop. The remote desktop may be an instance of a user's computer system or virtual machine that runs remotely to the client device and user, such as in a remote data center. The user accesses the remote desktop through a network using the remote display protocol.

Users may access the remote desktop using a variety of devices. For example, a user may use both a desktop computer and a mobile device. Typically, the application or content from the remote desktop is in a format compatible with the desktop computer. However, the mobile device typically displays content in a different native resolution on a smaller screen. When displaying the content from the application on the mobile device, the content may be converted or transformed for compatibility reasons. However, the conversion may not always be accurate and errors may result, such as mismatching name/input pairs, lost button descriptions, and other unexpected inaccuracies. These errors may confuse the users, or in more severe cases, cause users to operate the application incorrectly or input incorrect information.

SUMMARY

In one embodiment, a mobile computing device receives content in a desktop compatible format. The content is generated by a remote desktop executing an application. The mobile computing device determines a conversion of at least a first portion of the content to a native display format of the mobile computing device and displays the conversion of the at least the first portion of the content in the native display format on an interface. Also, the mobile computing device displays at least a second portion of the content in the desktop compatible format on the interface where the at least the second portion of the content in the desktop compatible format corresponds to the conversion of the at least the first portion of the content in the native display format of the mobile computing device.

The following detailed description and accompanying drawings provide a better understanding of the nature and advantages of particular embodiments.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a feedback and correction system in a virtual desktop infrastructure (VDI) environment. A user's remote desktop may execute an application that generates content, such as a webpage or other application content. The content may be in a first format, such as a desktop compatible format for a desktop computing system. However, the user may be using a client device, such as a mobile device, where the content may not be suitable for display in the first format. For example, the client device may have a different native resolution from the desktop computing system, which makes displaying the desktop compatible content hard to read and use. To help with usability, the remote desktop may generate metadata for converting the content to a second format, such as a mobile compatible format or native display format, for the client device. The remote desktop then sends the metadata to the client device along images of the original content in the desktop compatible format. The client device may then convert the original content to the native display format compatible with the client device using the metadata.

As discussed above in the Background, errors may result in the conversion or the converted content may be hard to understand on the smaller screen of the client device. Accordingly, particular embodiments display a feedback layer on the client device that shows a snapshot of a portion of the original content. The user can then see what the original content looked like to determine if the conversion was incorrect or can use the original content to better understand the converted content. Also, the user may provide feedback that the conversion is incorrect to allow future conversions of the content to be corrected.

Figure 1:
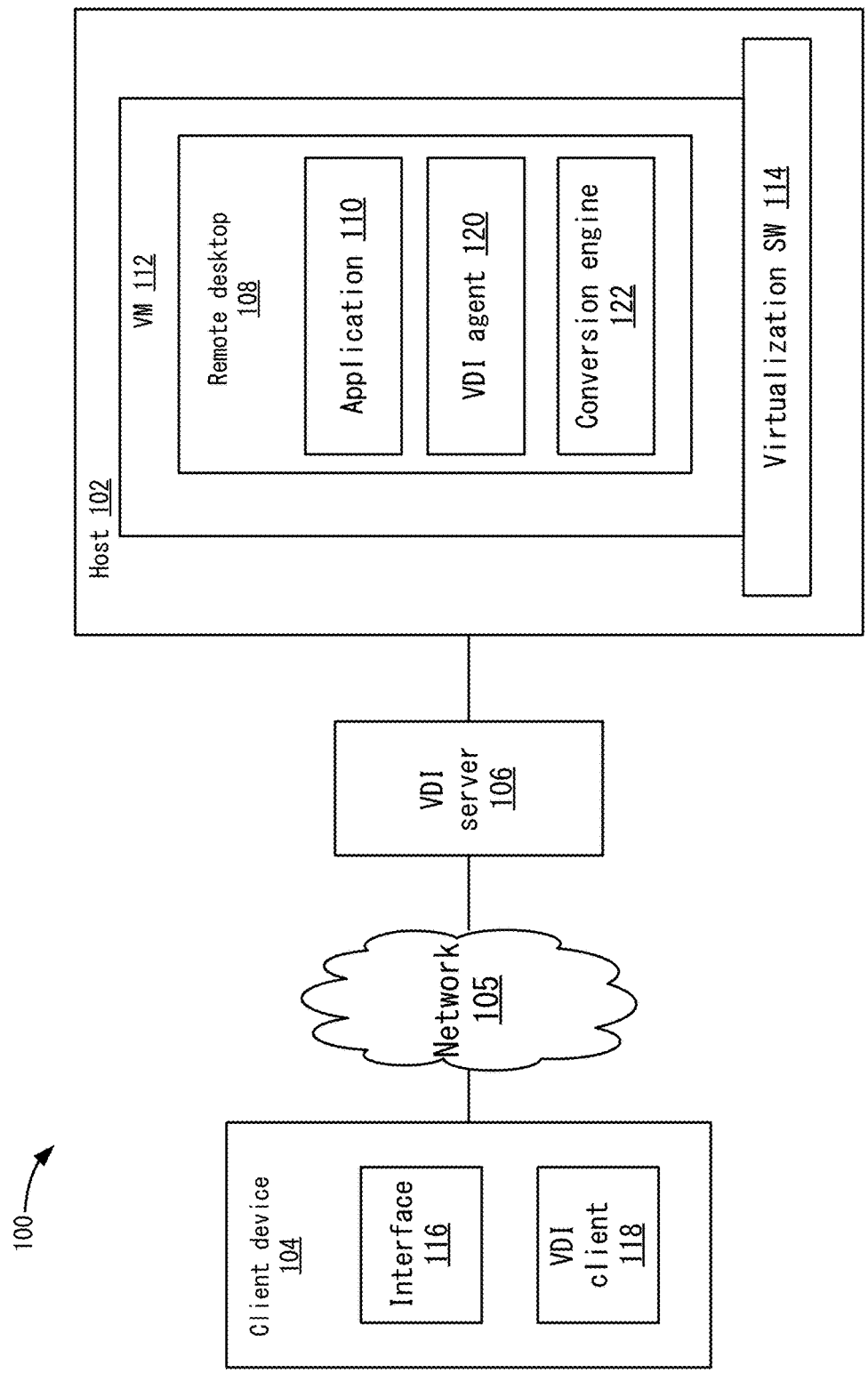
FIG. 1 depicts a simplified system of a remote desktop environment for providing a feedback layer according to one embodiment.

FIG. 1 depicts a simplified system 100 of a remote desktop environment for providing a feedback layer according to one embodiment. System 100 includes a host 102 and a client device 104 that communicate through a network 105 and VDI server 106. Host 102 and client device 104 use a remote desktop protocol to display images at client device 104 of a desktop graphical user interface (GUI) that is provided by a remote desktop 108 running on host 102.

In one embodiment, remote desktop 108 may be executing an application 110 in a virtualized environment, such as in a virtual machine (VM) 112 running on top of virtualization software 114 in host 102. A person of skill in the art would appreciate how to implement remote desktop 108 in the virtualized environment. Also, although a virtualized environment is described, remote desktop 108 may be running in a non-virtualized environment. For example, other environments where a remote application running on a physical computing system transmits image data for application 110 to client device 104 may be used.

The running of remote desktop 108 on host 102 displays images of content on an interface 116 of client device 104. In one example, a VDI client 118 may receive input/output (I/O) commands from client device 108, such as from input devices including a touch screen, keyboard, or mouse. A VDI client 118 sends the I/O commands to remote desktop 108 through VDI server 106. In one example, VDI server 106 may act as a broker to connect VDI client 118 to remote desktop 108. A VDI agent 120 in remote desktop 108 receives the I/O commands and processes them using application 110. For example, the I/O command may be input into application 110, which may cause an image of the remote desktop to update. VDI agent 120 may then send frame updates for the content through VDI server 106 to VDI client 118. Then, VDI client 118 can display the frame updates on interface 116.

As described above, client device 104 may display content in interface 116 in a different format from the original content generated by application 110 in remote desktop 108. For example, a characteristic of interface 116 may be different from the content generated by application 110, which may be a desktop compatible application. That is, interface 116 may display content in a different native format, such as a different native resolution from the native resolution of application 110. To display the original content in a format that is better compatible with interface 116, the content may be converted to a different layout. The different layout may reorganize, remove, or change the content.

In one embodiment, a conversion engine 122 generates and provides metadata to VDI client 118 that describes a conversion of the content. VDI client 118 uses the metadata to convert the image of the original content to a native display format of client device 104, such as to a format compatible with the native resolution of interface 116 or to a mobile compatible layout. Also, in another embodiment, conversion engine 122 may perform the conversion and then send a converted image to VDI client 118, which can display the image without performing any conversion.

VDI client 118 receives the metadata for the conversion and also an image of the original content. VDI client 118 can then use the metadata to convert the original content to a format for client device 104. For example, VDI client 118 determines an active area in which a user is interacting with on interface 116 and converts the original content around the active area. VDI client 118 then displays the converted content in interface 116.

In some cases, the conversion of the original content may incur errors or may be hard to read on interface 116. To provide a user with a reference that may help with incorrect or hard-to-read content, VDI client 118 provides a feedback layer that is also displayed in interface 116. The feedback layer may include the original content before the conversion, such as a snapshot or a portion of the original content. For example, the portion of the original content may correspond to the active area on interface 116 in which a user is actively interacting. By providing the feedback layer, a user can observe the converted content as well as the original content as a comparison, which may reduce the possibility of misunderstanding the converted content. Also, the user may recognize incorrect content and provide an input indicating that the conversion is incorrect. As will be discussed in more detail below, a correction process may also be performed to allow a user to indicate which of the converted content is incorrect.

Figure 2:
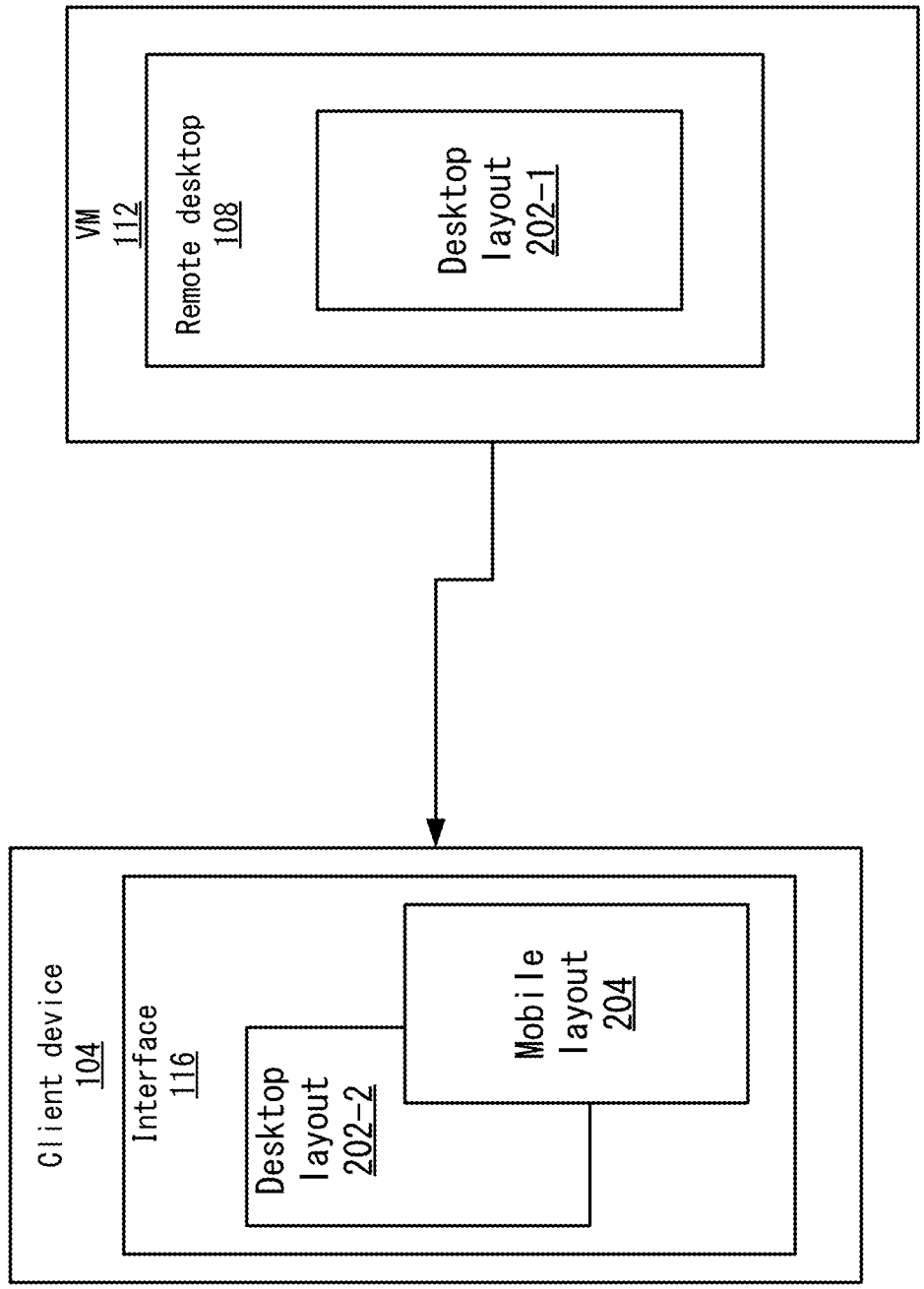
FIG. 2 shows an example of the feedback layer and the converted content layer according to one embodiment.

FIG. 2 shows an example of the feedback layer and the converted content layer according to one embodiment. In remote desktop 108, an image of a desktop layout 202-1 is shown. This is the image output by application 110 in the first format (e.g., a desktop compatible format). The feedback layer in client device 104 displays a desktop layout 202-2 and the converted content layer in client device 104 displays a mobile layout 204. As discussed above, desktop layout 202 is in a desktop compatible format and mobile layout 204 is in a mobile display format. Also, other compatible formats may be appreciated, but for discussion purposes, a desktop format and mobile format are used.

VDI client 118 generates mobile layout 204 based on the metadata generated by conversion engine 122. In one embodiment, interface 116 may display desktop layout 202-2 behind mobile layout 204. That is, mobile layout 204 may be superimposed on top of desktop layout 202-2. Desktop layer 202-2 may be the same image as desktop layout 202-1. However, it is possible that the full image of desktop layout 202-1 may not fit in interface 116. In this case, desktop layout 202-2 includes a portion of desktop layout 202-1, and the portion is viewable in addition to all of mobile layout 204 on interface 116. Other examples of displaying desktop layout 202-2 and mobile layout 204 may also be appreciated. For example, interface 116 may display mobile layout 204 on a right side of interface 116 and display desktop layout 202-2 on the left side of interface 116.

Figure 3A:
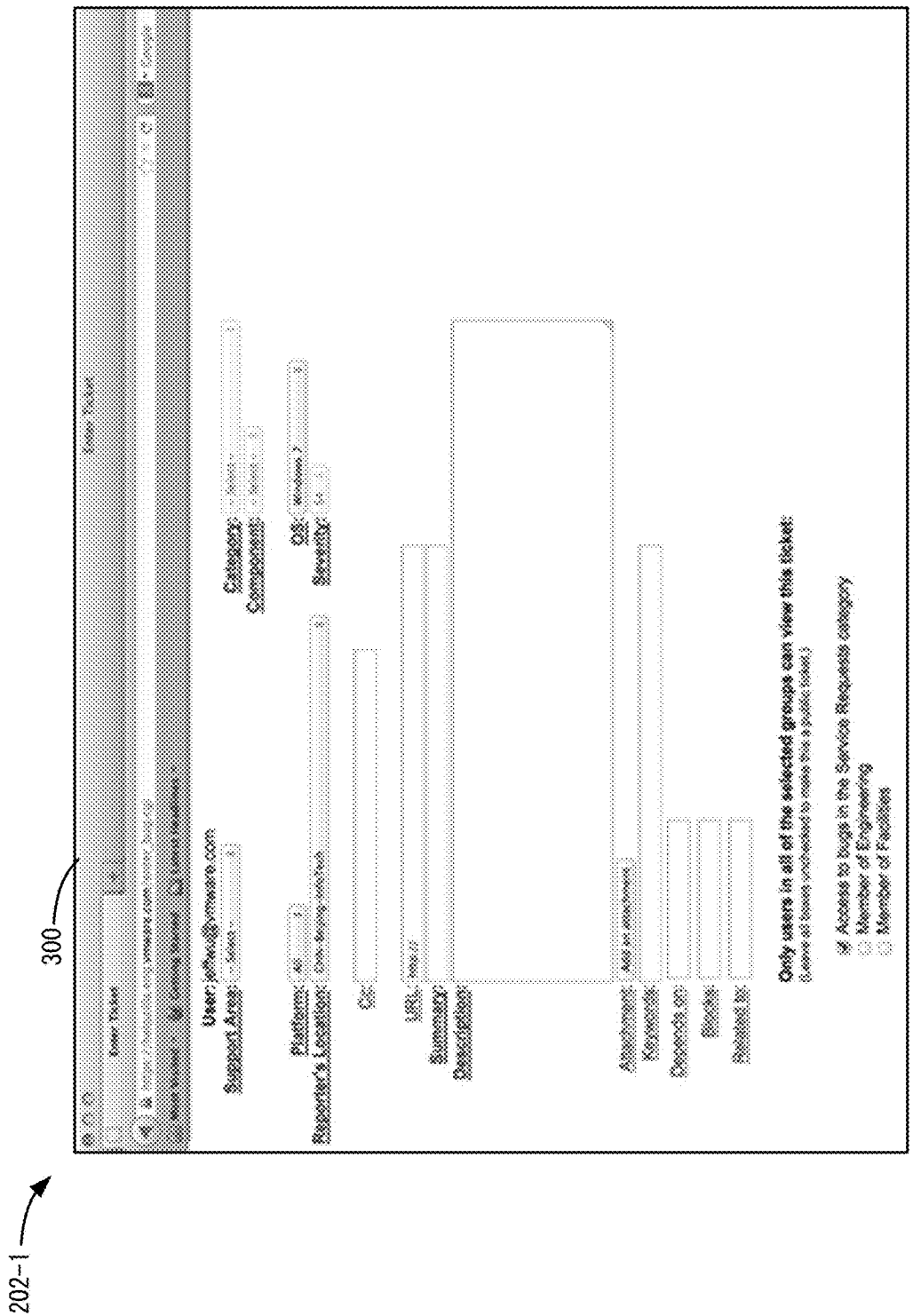
FIG. 3A shows an example of a desktop layout according to one embodiment.
Figure 3B:
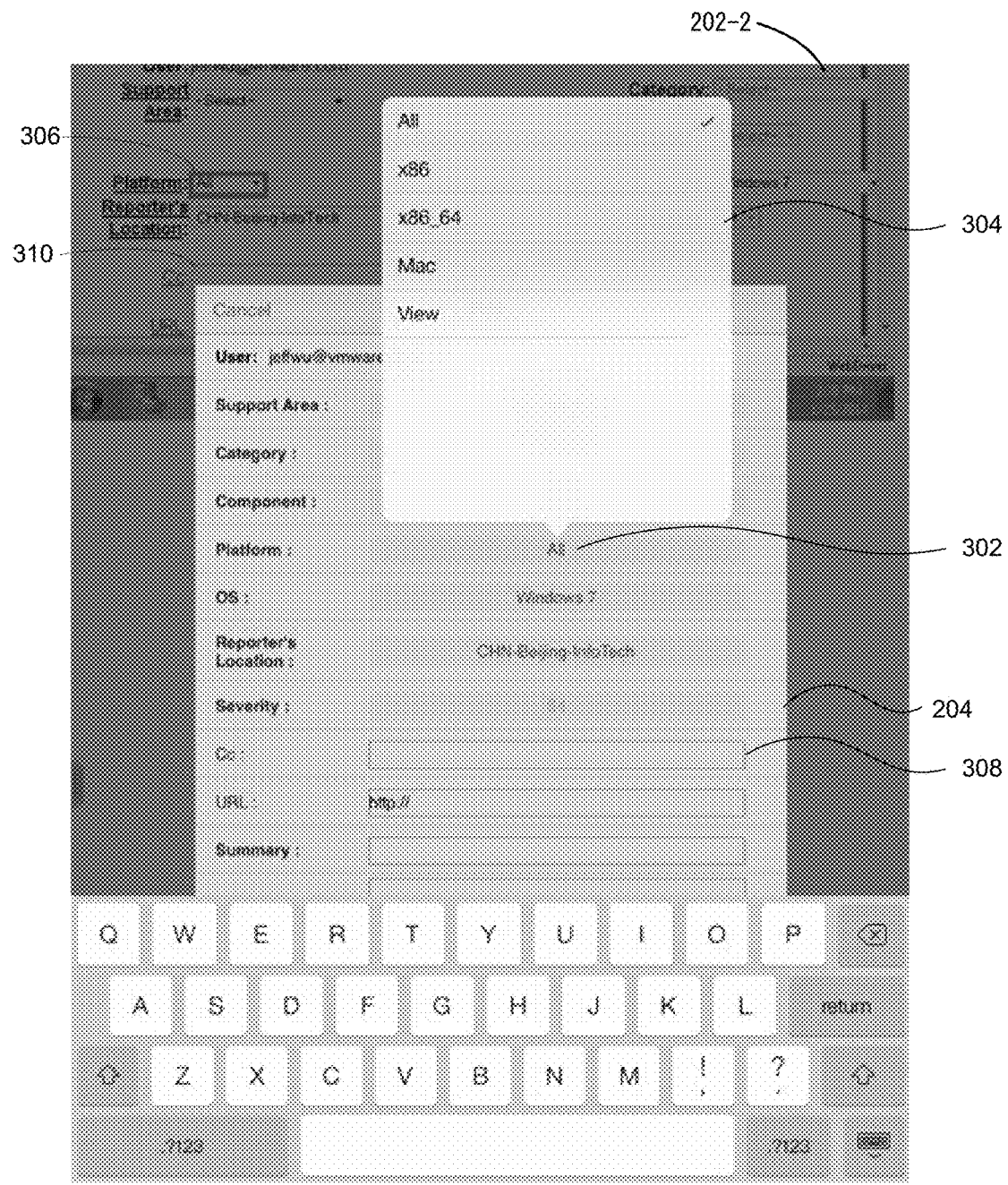
FIG. 3B shows an example of an interface according to one embodiment.

FIGS. 3A and 3B show more detailed examples of desktop layouts 202-1 and 202-2 and mobile layout 204 according to one embodiment. FIG. 3A shows an example of desktop layout 202-1 according to one embodiment. In this case, a page 300 is displayed in a first format, such as the desktop compatible format. This may be a full page of the content in the native desktop resolution.

FIG. 3B shows an example of interface 116 according to one embodiment. VDI client 118 has converted the original content to mobile layout 204. Also, VDI client 118 has determined a portion of desktop layout 202-1 to display in the feedback layer as desktop layout 202-2. As shown, mobile layout 204 has been superimposed over desktop layout 202-2.

Mobile layout 204 includes similar entries as desktop layout 202-1. However, the entries have been reorganized into a different layout that is easier to read on interface 116. Further, the input areas may be changed to be compatible with client device 104. Also, the resolution of mobile layout 204 may be different from the resolution of desktop layout 202-1.

To determine which content to convert, VDI client 118 may determine an area where the user may be active in interface 116. For example, the user may be active in a portion of mobile layout 204, such as at 302, the user has selected an entry box for "platform:". The user's input has displayed a menu 304 with options in mobile layout 204. VDI client 118 then determines a corresponding area in the original content from desktop layout 202-1 and converts this area to the mobile layout.

Also, VDI client 118 may want to display a snapshot of a portion of desktop layout 202-1 that is associated with where the user is active in mobile layout 204. As shown, VDI client 118 has displayed a snapshot of the portion of desktop layout 202-1 that includes the same entry box of "platform:" that has been displayed in interface 116 in mobile layout 204. Interface 116 displays this portion as desktop layout 202-2 such that it is visible to the user. VDI client 118 has also moved the corresponding active area in desktop layout 202-2 to be visible in interface 116.

As will be described in more detail below, VDI client 118 may also perform corresponding actions in the feedback layer that may help with the understanding of the conversion. For example, at 306, a corresponding entry of "platform:" has been highlighted in desktop layout 202-2. In this case, the user can refer to desktop layout 202-2 to make sure that mobile layout 204 is correct or for reference to understand mobile layout 204. Also, when a user navigates to different active areas on mobile layout 204, VDI client 118 may move the highlighted area in desktop layout 202-2 to a corresponding position. For example, if the user navigates to the "Cc:" entry box on the mobile layout shown at 308, then VDI client 118 may highlight the corresponding entry box "Cc:" shown at 310 in the feedback layer. In this way, the user may continuously refer to the feedback layer and be notified what is the corresponding area in the desktop layout. Further, if the user navigates to a position in mobile layout 204 that requires a new portion of desktop layout 202-1 to be displayed, VDI client 118 may determine the new portion and display that portion in the feedback layer as desktop layout 202-2.

Figure 4:
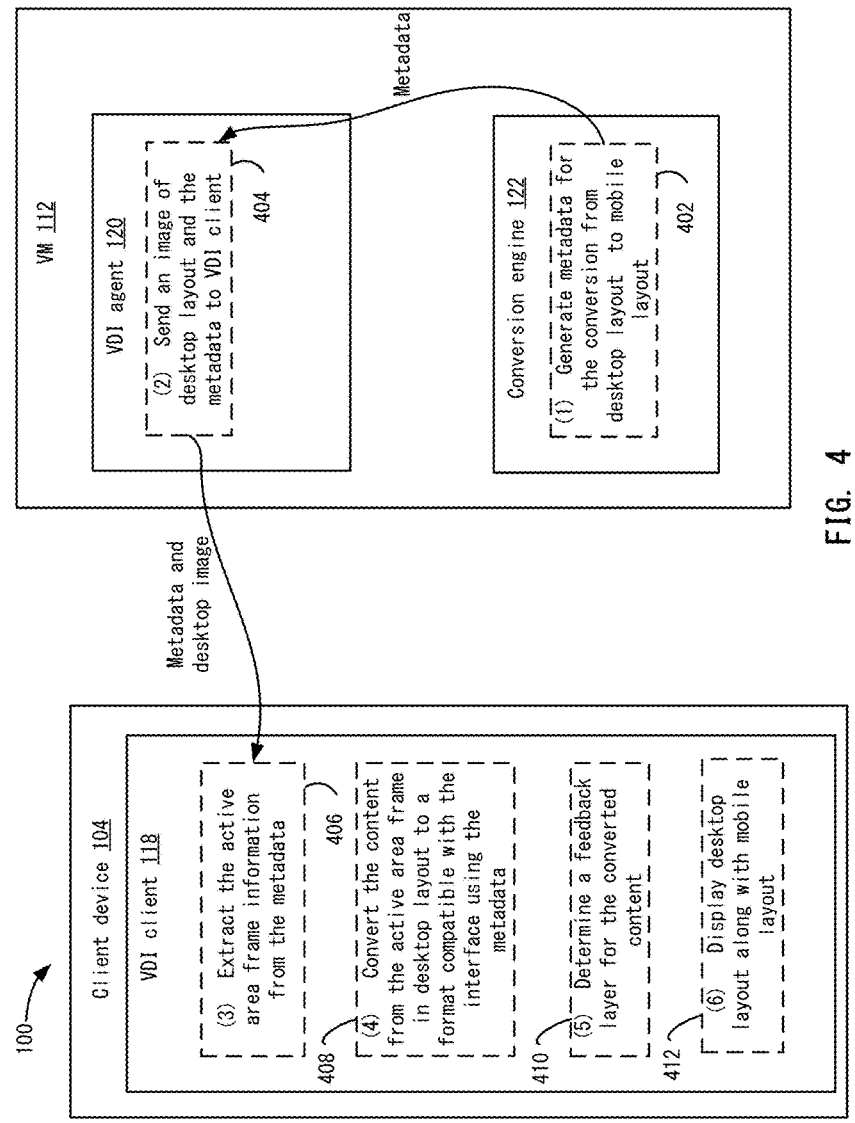
FIG. 4 depicts a more detailed example of the system for generating the feedback layer according to one embodiment.

The following will now describe the generation of the feedback layer in more detail and then other features, such as the correction of any incorrect conversion of content, will be described. FIG. 4 depicts a more detailed example of system 100 for generating the feedback layer according to one embodiment. In a step 1 (reference #402), conversion engine 122 generates metadata for the conversion from desktop layout 202-1 to mobile layout 204. The metadata may describe the conversion or content in a way that allows VDI client 118 to perform the conversion. In one embodiment, the metadata may describe a conversion for the whole image of desktop layout 202-1. However, in other embodiments, the metadata may only describe a portion of the image of desktop layout 202-1, such as that portion that a user may be actively using in interface 116. For example, the metadata contains conversion information for a "hot pot area frame", which is the area in which a user is actively operating on in interface 116. In one example, the hot pot area frame may be the portion of mobile layout 204 around which a user has input a command, such as selecting an entry box.

In a step 2 (reference #404), VDI agent 120 sends an image of desktop layout 202-1, such as a frame of the original content (e.g., the whole page or a portion of the page that changed), and the metadata to VDI client 118. The metadata may describe the conversion for the entire content or just a portion that changed. The content and the metadata may be sent through VDI server 106.

In a step 3 (reference #406), VDI client 118 extracts the active area frame information from the metadata. For example, mobile layout 204 may not be able to display the entire page of desktop layout 202-1. In this case, VDI client 118 determines an active area frame and extracts information for this frame from the metadata. Then, in a step 4 (reference #408), VDI client 118 converts the content from the active area frame in desktop layout 202-1 to a format compatible with interface 116 using the metadata. For example, some of the entries in desktop layout 202-1 may be converted to a different layout.

In a step 5 (reference #410), VDI client 118 determines a feedback layer for the converted content. For example, VDI client 118 captures a portion of an image of desktop layout 202-1 to display as desktop layout 202-2. The portion may be based on the active area frame. That is, desktop layout 202-2 at least includes information in the active area frame and possible neighboring information. In other embodiments, VDI client 118 may capture the entire page as desktop layout 202-2. For example, VDI client 118 may capture an image of the native screen of interface 116 as desktop layout 202-2. Also, VDI client 118 may highlight the active area as described above, such as VDI client 118 highlights an entry box into which a user is inputting information in mobile layout 204.

In a step 6 (reference #412), VDI client 118 displays desktop layout 202-2 along with mobile layout 204. In one embodiment, desktop layout 202-2 may be displayed behind mobile layout 204 as described above. The user may then view both mobile layout 204 and desktop layout 202-2 and perform additional actions, such as provide input commands (e.g., select fields of an entry box) for mobile layout 204. The above process continues as VDI client 118 continually updates mobile layout 204 and desktop layout 202-2.

Figure 5:
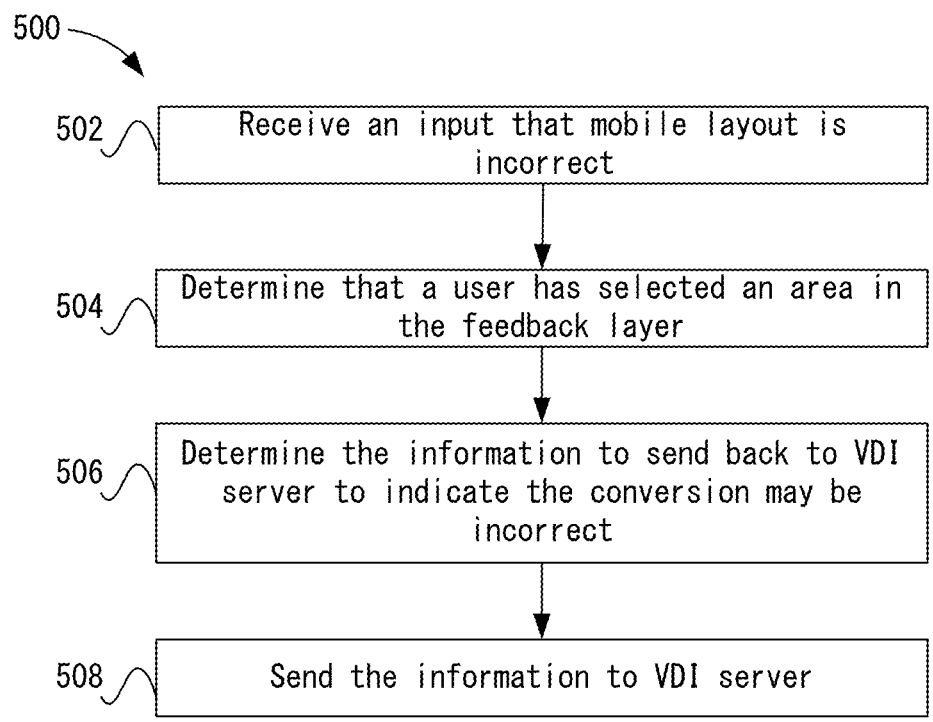
FIG. 5 depicts a simplified flowchart of a method for providing feedback when an incorrect conversion occurs according to one embodiment.

During the interaction, when a user notices that the conversion may be incorrect, particular embodiments may allow the user to indicate that mobile layout 204 is incorrect. FIG. 5 depicts a simplified flowchart 500 of a method for providing feedback when an incorrect conversion occurs according to one embodiment. At 502, VDI client 118 receives an input that mobile layout 204 is incorrect. For example, a user may look at the feedback layer displayed in interface 116 and determine that the conversion to mobile layout 204 is incorrect. In one example, an entry box that has been converted in mobile layout 204 may be mislabeled when compared to desktop layout 202-2.

Particular embodiments may provide different options for a user to provide the feedback. In one example, at 504, VDI client 118 determines that a user has selected an area in the feedback layer. For example, the user may select the highlighted portion shown at 306 in FIG. 3B to indicate that this conversion of the highlighted active area is incorrect.

When a user indicates an error occurs, at 506, VDI client 118 may then determine the information to send back to VDI server 106 (or remote desktop 108 or another device) to indicate the conversion may be incorrect. In one embodiment, the information that is sent back may be enough information such that the error could be determined and corrected. In one example, VDI client 118 captures an area around where the user selected in desktop layout 202-2, determines the corresponding area in desktop layout 202-1, and marks this area in the whole image of desktop layout 202-1. For example, interface 116 may have only been displaying a portion of desktop layout 202-1. However, to correct the incorrect conversion, having the whole image of desktop layout 202-1 may be useful. Thus, VDI client 118 determines the area the user selected as being incorrect with reference to the entire image of desktop layout 202-1 and marks this area as incorrect on desktop layout 202-1. For example, VDI client 118 may mark an entry box in the image for desktop layout 202-1 as being incorrect. Also, VDI client 118 may also include mobile layout 204 and desktop layout 202-2 as information to send back to VDI server 106.

At 508, VDI client 118 then sends the information to VDI server 106. Once VDI server 106 receives the information, VDI server 106 may store the information for later processing. In one example, a user may analyze various examples of incorrect conversions that are stored by VDI server 106 and make corrections. The user may then upload the corrections to conversion engine 122 such that future conversions reflect the corrections. In other embodiments, VDI server 106 may automatically determine what the error is and upload corrections to conversion engine 122. Then, when a similar image is output by application 110, conversion engine 122 determines different metadata for the correct conversion.

In another embodiment, the user may indicate an incorrect conversion using other methods. For example, a user may select an error "button" or other input to indicate the incorrect conversion. In one example, an error button may be located in interface 116. When the user selects the error button, VDI client 118 may note the active area in desktop layout 202-2 and mark this area in desktop layout 202-1. VDI client 118 may then send this information back to VDI server 106.

Accordingly, particular embodiments provide a feedback layer to allow a user to determine when a conversion to a mobile layout is incorrect. Also, the feedback layer may be used to better understand the mobile layout. Particular embodiments also provide a mechanism for a user to indicate that the conversion is incorrect. This allows particular embodiments to improve the conversion in the future.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
  receiving, by a mobile computing device, an image of content in a desktop compatible format, wherein a remote desktop running on a host computer is executing an application to generate the content in the desktop compatible format;
  determining, by the mobile computing device, a conversion of at least a first portion of the image of content to a native display format of the mobile computing device;
  displaying, by the mobile computing device, the conversion of the at least the first portion of the image of content in the native display format on an interface;
  concurrently displaying, by the mobile computing device, both the at least the first portion of the image of content in the desktop compatible format along with the conversion of the at least the first portion of the image of content in the native display format on the interface;
  receiving, by the mobile computing device, a feedback input from a user of the mobile computing device indicating that the conversion of the at least the first portion of the image of content to the native display format is incorrect, wherein the feedback input is received following the concurrent display of both the at least the first portion of the image of content in the desktop compatible format along with the conversion of the at least the first portion of the image of content in the native display format on the interface; and capturing, by the mobile computing device, information associated with the conversion of the at least the first portion of the image of content to the native display format.

2. The method of claim 1, wherein determining the conversion comprises:
receiving metadata for converting the at least the first portion of the image of content to the native display format, wherein the metadata is generated by the remote desktop; and
using the metadata to generate the conversion of the at least the first portion of the image of content to the native display format.

3. The method of claim 1, further comprising:
determining an active area on the interface; and
determining the conversion of the at least the first portion of the image of content based on the active area.

4. The method of claim 3, wherein the conversion of the at least the first portion of the image of content in the native display format includes the active area, the method further comprising:
displaying an indication on the active area in the at least the first portion of the image of content in the desktop compatible format.

5. The method of claim 1, further comprising:
sending the captured information for the conversion to a device as an indication of the incorrect conversion.

6. The method of claim 1, wherein:
the desktop compatible format comprises a first layout native to the application, and
the native display format comprises a second layout native to the mobile computing device that is different from the first layout native to the application.

7. A non-transitory computer-readable storage medium containing instructions, that when executed, control a mobile computing device to be configured for:
receiving an image of content in a desktop compatible format, wherein a remote desktop running on a host computer is executing an application to generate the content in the desktop compatible format;
determining a conversion of at least a first portion of the image of content to a native display format of the mobile computing device;
displaying the conversion of the at least the first portion of the image of content in the native display format on an interface;
concurrently displaying both the at least the first portion of the image of content in the desktop compatible format along with the conversion of the at least the first portion of the image of content in the native display format on the interface;
receiving a feedback input from a user of the mobile computing device indicating that the conversion of the at least the first portion of the image of content to the native display format is incorrect, wherein the feedback input is received following the concurrent display of both the at least the first portion of the image of content in the desktop compatible format along with the conversion of the at least the first portion of the image of content in the native display format on the interface; and
capturing information associated with the conversion of the at least the first portion of the image of content to the native display format.

8. The non-transitory computer-readable storage medium of claim 7, wherein determining the conversion comprises:
receiving metadata for converting the at least the first portion of the image of content to the native display format, wherein the metadata is generated by the remote desktop; and
using the metadata to generate the conversion of the at least the first portion of the image of content to the native display format.

9. The non-transitory computer-readable storage medium of claim 7, further comprising:
determining an active area on the interface; and
determining the conversion of the at least the first portion of the image of content based on the active area.

10. The non-transitory computer-readable storage medium of claim 9, wherein the conversion of the at least the first portion of the image of content to the native display format includes the active area, further configured for:
displaying an indication on the active area in the at least the second portion of the image of content in the desktop compatible format.

11. The non-transitory computer-readable storage medium of claim 7, further configured for:
receiving feedback input indicating that the conversion of the at least the first portion of the image of content to the native display format is incorrect; and
capturing information associated with the conversion of the at least the first portion of the image of content to the native display format.

12. The non-transitory computer-readable storage medium of claim 11, further configured for:
sending the captured information for the conversion to a device as an indication of the incorrect conversion.

13. The non-transitory computer-readable storage medium of claim 7, wherein:
the desktop compatible format comprises a first layout native to the application, and
the native display format comprises a second layout native to the mobile computing device that is different from the first layout native to the application.

14. A mobile computing device comprising:
one or more computer processors; and
a non-transitory computer-readable storage medium comprising instructions, that when executed, control the one or more computer processors to be configured for:
receiving an image of content in a desktop compatible format, wherein a remote desktop running on a host computer is executing an application to generate the content in the desktop compatible format;
determining a conversion of at least a first portion of the image of content to a native display format of the mobile computing device;
displaying the conversion of the at least the first portion of the image of content in the native display format on an interface;
concurrently displaying both the at least a second portion of the image of content in the desktop compatible format along with the conversion of the at least the first portion of the image of content in the desktop compatible format on the interface;
receiving a feedback input from a user of the mobile computing device indicating that the conversion of the at least the first portion of the image of content to the native display format is incorrect, wherein the feedback input is received following the concurrent display of both the at least the first portion of the image of content in the desktop compatible format along with the conversion of the at least the first portion of the image of content in the native display format on the interface; and capturing information associated with the conversion of the at least the first portion of the image of content to the native display format.

15. The mobile computing device of claim 14, wherein determining the conversion comprises:
receiving metadata for converting the at least the first portion of the image of content to the native display format, wherein the metadata is generated by the remote desktop; and
using the metadata to generate the conversion of the at least the first portion of the image of content to the native display format.

16. The mobile computing device of claim 14, further configured for:
determining an active area on the interface; and
determining the conversion of the at least the first portion of the image of content based on the active area.

17. The mobile computing device of claim 16, wherein the conversion of the at least the first portion of the image of content to the native display format includes the active area, the apparatus further configured for:
displaying an indication on the active area in the at least the second portion of the image of content in the desktop compatible format.

18. The mobile computing device of claim 14, further configured for:
receiving feedback input indicating that the conversion of the at least the first portion of the image of content to the native display format is incorrect; and
capturing information associated with the conversion of the at least the first portion of the image of content to the native display format.

19. The mobile computing device of claim 18, further configured for:
sending the captured information for the conversion to a device as an indication of the incorrect conversion.

20. The mobile computing device of claim 14, wherein:
the desktop compatible format comprises a first layout native to the application, and
the native display format comprises a second layout native to the mobile computing device that is different from the first layout native to the application.

* * * * *